(12) United States Patent
Coakley

(10) Patent No.: US 11,958,570 B1
(45) Date of Patent: Apr. 16, 2024

(54) SANDWICH CABLE FAIRING APPARATUS AND METHOD WITH A CENTRAL DAMPING LAYER

(71) Applicant: United States of America as Represented by the Secretary of the Navy, Arlington, VA (US)

(72) Inventor: David B Coakley, Alexandria, VA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 435 days.

(21) Appl. No.: 17/412,280

(22) Filed: Aug. 26, 2021

Related U.S. Application Data

(60) Provisional application No. 63/135,034, filed on Jan. 8, 2021.

(51) Int. Cl.
| | |
|---|---|
| *B63B 21/66* | (2006.01) |
| *B32B 7/12* | (2006.01) |
| *B32B 27/08* | (2006.01) |
| *B32B 27/30* | (2006.01) |
| *B32B 27/40* | (2006.01) |
| *B63B 21/20* | (2006.01) |

(52) U.S. Cl.
CPC ............... *B63B 21/20* (2013.01); *B32B 7/12* (2013.01); *B32B 27/08* (2013.01); *B32B 27/30* (2013.01); *B32B 27/40* (2013.01); *B63B 21/663* (2013.01); *B32B 2250/24* (2013.01); *B32B 2307/56* (2013.01); *B32B 2307/732* (2013.01)

(58) Field of Classification Search
CPC ......... B63B 21/20; B63B 21/663; B32B 7/12; B32B 27/08; B32B 27/30; B32B 27/40; B32B 2250/24; B32B 2307/56; B32B 2307/732; G01V 1/201
See application file for complete search history.

(56) References Cited

U.S. PATENT DOCUMENTS

| | | | | |
|---|---|---|---|---|
| 3,343,515 | A | * 9/1967 | Nichols ................. | B63B 21/663 114/254 |
| 3,472,196 | A | * 10/1969 | Ewing .................... | D07B 5/005 156/85 |
| 3,895,595 | A | * 7/1975 | Kelly ...................... | D07B 1/12 114/67 R |

(Continued)

FOREIGN PATENT DOCUMENTS

CN             114455001 A    * 5/2022

*Primary Examiner* — Andrew Polay
(74) *Attorney, Agent, or Firm* — Dave Ghatt; Jesus J. Hernandez

(57) ABSTRACT

A sandwich cable fairing designed for attachment to cables that are towed at operational speeds by marine vessels. The sandwich cable fairing has a design that combines layers of elastic and damping materials. The fairing dampens the vibration caused when the cable is towed at operational speeds. The outer layers ("bread") of the fairing are made from a material with a modulus of elasticity that provides a desired amount of stiffness. In the middle of the sandwich cable fairing is damping layer made from a viscoelastic material. The layering of materials allows the fairing to have the flexibility to be crushed by cable equipment while maintaining the requisite stiffness to reducing flapping and the resulting vibration.

14 Claims, 5 Drawing Sheets

(56) References Cited

U.S. PATENT DOCUMENTS

| | | | |
|---|---|---|---|
| 4,084,065 A * | 4/1978 | Swenson | H01B 7/182 |
| | | | 87/8 |
| 4,542,708 A | 9/1985 | Holcombe et al. | |
| 4,567,841 A | 2/1986 | Hale | |
| 5,275,120 A * | 1/1994 | Ruffa | F15D 1/10 |
| | | | 114/243 |
| 6,244,204 B1 * | 6/2001 | Weyman | B63B 21/663 |
| | | | 114/243 |
| 10,286,983 B1 * | 5/2019 | Coakley | B63B 21/663 |
| 11,414,161 B1 * | 8/2022 | Coakley | B32B 5/02 |
| 2017/0334526 A1 * | 11/2017 | Godøy | F15D 1/10 |

\* cited by examiner

SANDWICH CABLE FAIRING APPARATUS AND METHOD WITH A CENTRAL DAMPING LAYER

CROSS-REFERENCE TO RELATED APPLICATIONS

This application claims the benefit of U.S. Provisional Application No. 63/135,034 filed Jan. 8, 2021, titled "Multi-Layered Sandwich Cable Fairing Apparatus and Method for Reducing Flapping," incorporated herein by reference.

This application is related to U.S. nonprovisional patent application, U.S. patent application Ser. No. 17/163,250, filed on Jan. 29, 2021, hereby incorporated by reference, entitled, "Multi-Layered Sandwich Cable Fairing Apparatus for Reducing Flapping," by inventor, David Coakley.

STATEMENT OF GOVERNMENT INTEREST

The following description was made in the performance of official duties by employees of the Department of the Navy, and thus, the claimed invention may be manufactured, used, licensed by or for the United States Government for governmental purposes without the payment of any royalties thereon.

TECHNICAL FIELD

The following description relates generally to a sandwich cable fairing designed for attachment to cables that are towed behind marine vessels, and in particular, a sandwich cable design that includes a damping layer insert.

BACKGROUND

Cable fairings are structures attached to cables typically towed by marine vessels. They are designed to streamline the water flow around the cable and reduce normal drag and cable vibration caused by vortex shedding. Faired cables are used in applications such as underwater geophysical exploration operations, including towing bodies and cable arrays from ships. There are several types of cable fairings used in these operations. Hard fairings are typically made of a mechanical shell that is clamped over sections of the cable. The shells are typically held together with screws or rivets. Another type of fairing is known as a zipper fairing which is made of a reinforced polyethylene (or similar material) that is wrapped around the cable and then sealed (zipped) to itself by the two free ends. There are also hairy fairings, which are hair-like flexible fibers woven into the outer strands of a tow cable. Another known type of fairing is the ribbon fairing. Ribbon fairings are typically flexible rectangular pieces of fabric or other material that are often woven into the outer strands of an armored tow cable.

Typically, ribbon fairings are all one material, or are constructed of fiber reinforced fabric materials to reduce breakage and damage due to use. While these ribbon fairings create decoherence in the vortex shedding behind cables which greatly reduces the vortex shedding induced vibrations of the cable, they do not induce significant damping in the fairing itself. When towed in a flow, these fairings can undergo large flapping motions, just as a flag does. At high speeds and more acute towing angles, these flapping motions increase and cause a significant amount of vibration and wear on the fairings.

Therefore, what is needed is a fairing material that minimizes fairing flapping thereby significantly reducing the incremental vibration created by existing ribbon fairings.

SUMMARY

Disclosed is sandwich cable fairing that combines layers of different elastic and damping materials to create a stiffer ribbon fairing than previously known. The fairing can prevent and dampen the vibration that results from the high frequency flapping caused by a cable being towed at a relatively high rate of speed. The fairing retains enough flexibility to wrap around the cable during handling operations.

In one aspect, the invention is a mono-ribbon sandwich cable fairing having several layers that are sandwiched together. The mono-ribbon sandwich cable fairing is a five-layer arrangement. The outer layers ("bread of the sandwich") of the fairing are made from a material with a relatively high modulus of elasticity, while the middle layer "filling" is made from a viscoelastic damping material. The filling material acts to dampen shearing motions at higher rates of speed. The layering of materials allows the fairing to have the flexibility to be wound and crushed on cable equipment such as drums and winches while increasing damping and stiffness to minimize flapping and the resulting vibration.

In another aspect, the invention is a mono-ribbon sandwich cable fairing having two outer rectangular layers of elastic material surrounding a five-sided polygon middle layer of damping material with a vertex point at the end of the fairing next to the cable. The damping middle layer has a total length and width equal to the length and width of the outer rectangular layers. However the vertex, which can vary in length, allows the middle layer to gradually increase in stiffness toward the aft end of the fairing giving the fairing increased mobility and flexibility near the cable and more resistance to flapping towards the back end.

In another aspect, the invention is a method for minimizing fairing flapping behind an armored cable. The method includes, weaving a rectangular strip of multilayered, adhesive material with a midpoint around armor strands of the cable up to the midpoint of the rectangular strip creating two equal length ends. In this aspect, the method also includes, folding the rectangular strip of adhesive material, around the armor strands of the cable, at its midpoint, and adhering the ends of the rectangular strip together to create a five layered mono-ribbon fairing extending from the cable. In this aspect, the five layered mono-ribbon fairing includes, a first layer of elastic material, a second layer of elastic material, a third layer of adhesive material between the first layer of elastic material and the second layer of elastic material, a fourth layer of adhesive material between the third layer of adhesive material and the second layer of elastic material. The five layered mono-ribbon fairing also includes and a fifth layer of damping material between the third layer of adhesive material and the fourth layer of adhesive material behind the cable.

In another aspect, the invention is a method for minimizing fairing flapping behind a cable. The method includes, weaving a rectangular strip of multilayered adhesive material with a midpoint around armor strands of the cable up to the midpoint of the rectangular strip, creating two equal length ends, and folding the rectangular strip of adhesive material at its midpoint around the armor strands and the cable. The method also includes, adhering the ends of the rectangular strip of adhesive material together to create a three layered mono-ribbon fairing extending from the cable. In this aspect, the three layered mono-ribbon fairing includes, a first layer of elastic material, a second layer of elastic material, and a third layer of damping material attached to and between the first and second layer of elastic material behind the cable. In this aspect, the third layer of damping material is a five-sided polygon with an equilateral triangle with its vertex toward an end of the third layer next to the cable.

BRIEF DESCRIPTION OF THE DRAWINGS

Other features will be apparent from the description, the drawings, and the claims.

DETAILED DESCRIPTION

Figure 1:
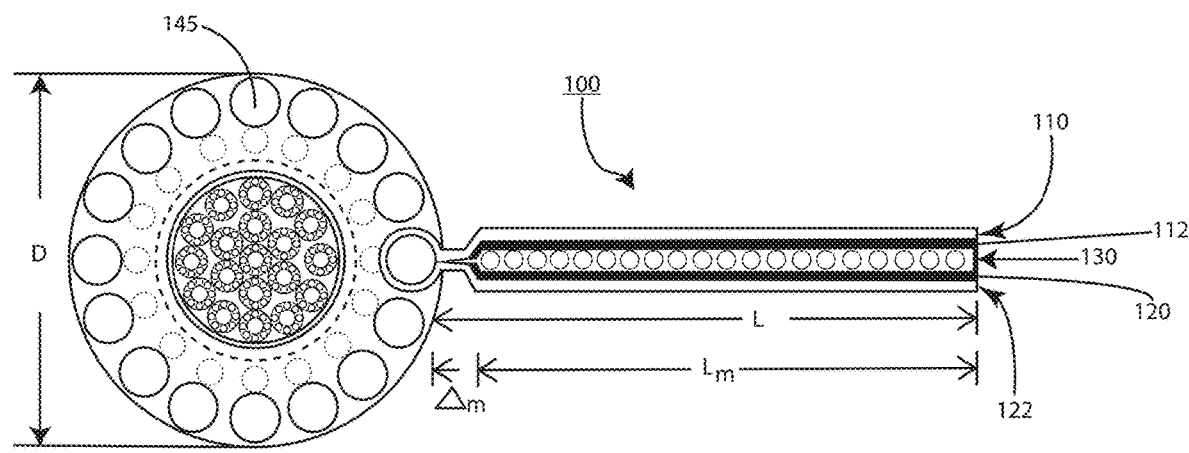
FIG. 1 shows a side perspective view of a five-layer mono-ribbon chevron sandwich cable fairing, according to an embodiment of the invention.

FIG. 1, shows the preferred embodiment of the mono-ribbon sandwich cable fairing 100 with five layers. FIG. 1 shows the cable fairing 100 attached to a cable 145, which may be an armored cable that is used to tow an object, vessel, or the like, behind a marine vessel. The mono-ribbon sandwich fairing 100 is constructed from multi-layered electrical tape, such as a vinyl electrical tape in a chevron ribbon shape. The use of a vinyl electrical tape provides stability to the overall structure. A standard mono ribbon shape may also be used in an alternative embodiment.

Figure 2:
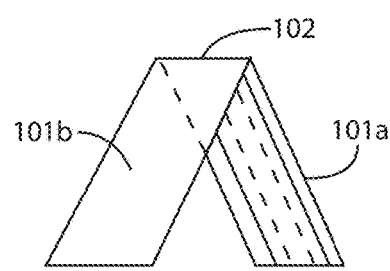
FIG. 2 is an exemplary explanatory illustration of a mono-ribbon sandwich cable fairing of FIG. 1, according to an embodiment of the invention.

FIG. 2 is an exemplary explanatory illustration of the mon-ribbon sandwich cable faring 100 of FIG. 1. FIG. 2 is provided to show how the ribbon is folded over, and not to show the layered structure, which is clearly shown in FIG. 1. As shown in the simplified illustration of FIG. 2, the mono-ribbon sandwich cable fairing 100 of FIG. 1 has legs 101a and 101b, which may described interchangeably as a first leg and a second leg, extending from a first side and a second side of the vertex. The legs 101a and 101b merely represent the portions of the ribbon that extend from the vertex 102. Typically, the vertex 102, the area where the ribbon is folded over, is located at a central portion of the ribbon, resulting in the legs 101a and 101b being equal in length. As outlined below, the layering of the embodiment of FIG. 1 results from the folding over of the ribbon structure and adhering the legs 101a and 101b together, with an adhesive, to form a single multi-layered structure.

Returning to FIG. 1, according to an embodiment, the legs of the ribbon are woven around a single strand or multiple strands of the armor of the cable at the midpoint of the ribbon, and the legs adhered together to form a single or mono-ribbon. FIG. 1 shows a side view of the sandwich cable fairing 100, which is a folded-over structure, and which as outlined below includes five layers of material. When folded-over, the legs are positioned around a damping layer, at the center of the sandwich arrangement.

As shown, the sandwich cable fairing 100 includes a first outer layer 110 and a second outer layer 122, which act as the "bread" of the sandwich arrangement. Layers 110 and 122 are made of an elastic material. According to an embodiment of the invention, the elastic material is vinyl. The third layer 112 and the fourth layer 120 are the adhesive layers of the adhesive tape. The fifth layer 130 is a damping material between the third layer 112 and the fourth layer 122. This damping layer 130, a central damping layer, is made of a viscoelastic material, such as a viscoelastic urethane polymer.

Figure 3:
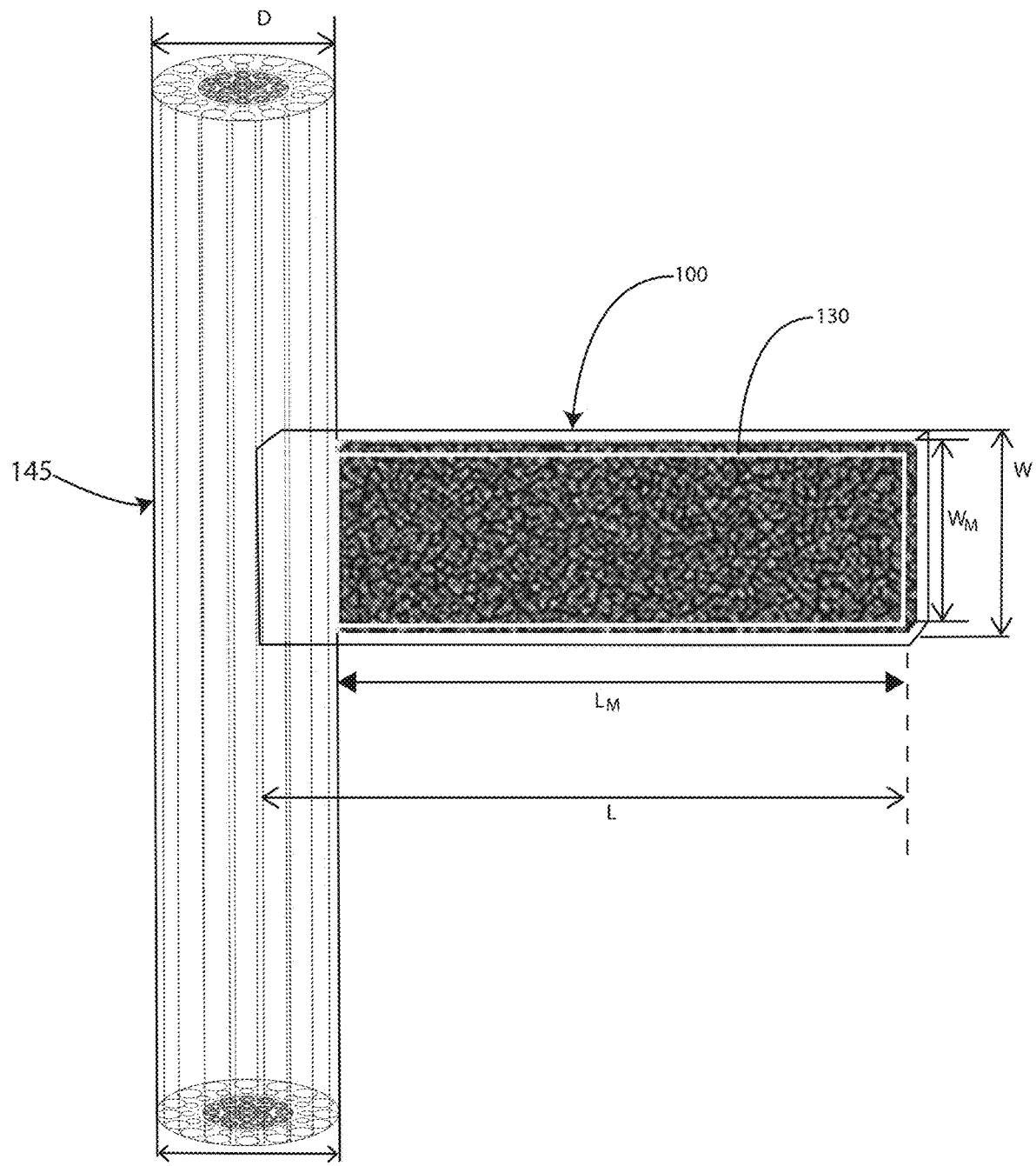
FIG. 3 is an exemplary top perspective illustration of the mono-ribbon sandwich cable fairing, according to an embodiment of the invention.

FIG. 3 is an exemplary top perspective illustration of the mono-ribbon sandwich cable fairing 100, according to an embodiment of the invention. FIG. 3 shows the folded over structure, the mono-ribbon sandwich cable fairing 100, woven into the armor of the cable 145. The fairing 100 extends away from the cable 145. As stated above, the mono-ribbon cable fairing 100 includes is a five-layer arrangement. FIG. 3 shows the fifth layer 130, the damping material, which is at the center of the multi-layered arrangement. For illustration only, the other layers are not shown.

According to the invention, this embodiment, shown in FIGS. 1 and 3, is constructed by cutting a sheet material such as adhesive tape, having an elastomeric layer covered/coated with an adhesive layer on one side. As shown in FIG. 3, the sheet material is cut into a rectangular strip having a length L and a width W. FIG. 1 also shows the length L. According to an embodiment of the invention, the length L of the rectangular strip is about 3-10 times the diameter D of the cable 145. According to this embodiment, the width W of the rectangular strip is about 0.2 to about 1.5 times the diameter D of the cable. According to another embodiment of the invention, the length L is about 6 D and the width W is 1.2 D, where D is the diameter of the cable 145, which is being faired.

FIG. 3 also shows the middle damping layer 130 having a length $L_M$ and a width $W_M$. The length $L_M$ and a width $W_M$ may be about the same or smaller in dimensions, as compared to the overall length L and a width W of the cable fairing 100. According to an embodiment of the invention, $L_M$ is 5.7 D and $W_M$ is 1.2 D, where D is the diameter of the cable 145. According to another embodiment of the invention, the middle damping layer has a length $L_M$ of about 0.85 L, and extends at a distance $\Delta_M$ (shown in FIG. 1) downstream of the fore end of the sandwich cable fairing 100.

Returning to FIG. 1, as shown, the middle damping layer 130 is only included in the portion of the fairing that is behind, but not abutting the cable 145. According to an embodiment of the invention, the damping layer 130 of viscoelastic material has a thickness t, which may be 0.003 inches to 0.03 inches thick, for cable diameters of about 0.4 inches. In alternative embodiments, the thickness t can be varied to provide additional damping. Generally, the thickness t of the damping layer 230 should be commensurate with the thickness of the outer elastic layers 110 and 120, i.e., scaled up when layers 110 and 120 are scaled up, and scaled down when layers 110 and 120 are scaled down. Layering of the viscoelastic material between the two elastic layers causes the flexible structure of the fairing to resist relative shear motion during waving motions of the fairing.

Viscoelastic materials exhibit both viscous and elastic characteristics when undergoing deformation. Viscous materials resist shear flow and strain, as a function of the time rate of strain. Elastic materials strain when stretched and quickly return to their original state once the stress is removed. Viscoelastic materials have elements of both of these properties and, as such, exhibit time-dependent strain. Consequently layering viscoelastic material between the outer elastic layers provides stiffness to the fairing to resist waves traveling along the fairing ribbon while allowing it to be flexible enough to be manipulated in mechanical applications, like being wrapped along with the cable, on drums, and in winches.

Mathematically, shear in a beam is equal to the derivative of the moment along the beam ($V=dM/dx$) where V is shear, M is moment around the beam, and x is the distance along the beam. Because, typically, there are one or two full waves (resulting directly from flapping motions) in the fairing that progress aft, both positive and negative curvature exists on the fairing ribbon. Consequently, there must be a nonzero shear ($dM/dx$).

It should be understood that the maximum shear stress is proportional to the shear, and is a maximum at the center of the ribbon, in the center of the middle layer. This is why the ribbon 100 is structured with the viscoelastic layer is in the center of the structure. Towards the end of the fairing, these wave (flapping) motions can become violent. Viscoelastic materials provide proportionately more damping of these higher speed flapping motions. That is, the faster the relative shear motion, the more damping force the viscoelastic material provides to resist these faster motions.

Figure 4:
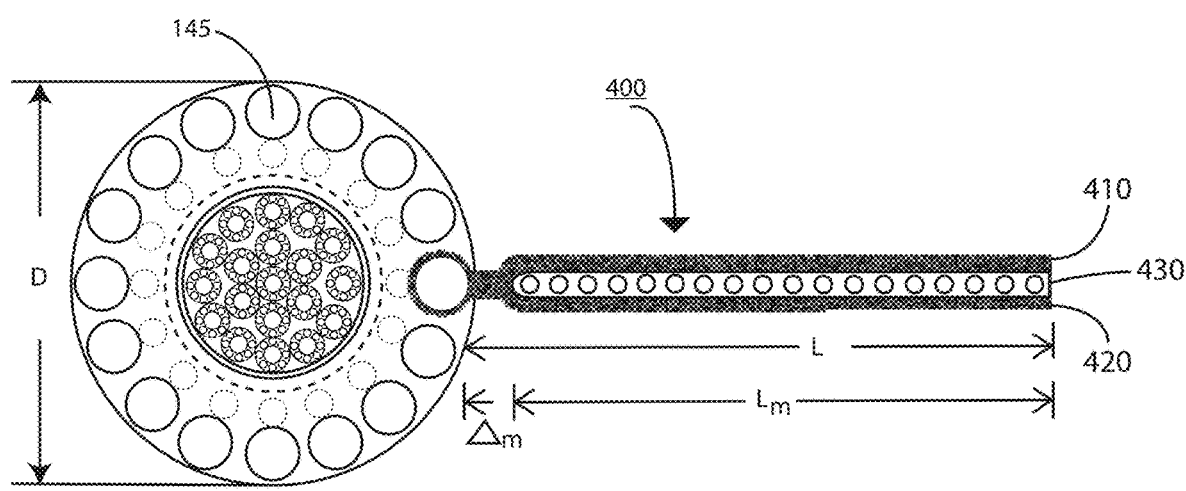
FIG. 4 shows a side perspective view of a three-layer mono-ribbon chevron sandwich cable fairing, according to an embodiment of the invention.

FIG. 4 shows an embodiment of the invention, a mono-ribbon sandwich cable fairing 400 with three layers. FIG. 4 shows the cable fairing 400 attached to a cable 145 such as an armored cable that is used to tow an object, vessel, or the like, behind a marine vessel. The mono-ribbon sandwich fairing 400 is constructed from an elastic material in a chevron ribbon shape. A standard mono ribbon shape may also be used in an alternative embodiment.

The sandwich fairing 400 of FIG. 4 is a folded over structure. The ribbon sandwich cable fairing 400 is formed from a single elastic layer that is folded over to form two outer layers that surround a damping layer therebetween, the outer layers and the damping layer combine to form the three-layer arrangement. FIG. 4 shows the sandwich cable fairing 400 having a first outer layer 410 and a second outer layer 420, which act as the "bread" of the sandwich arrangement. As stated, layers 410 and 420 are made of an elastic material. According to an embodiment of the invention, the elastic material is vinyl. A damping layer 430, a centrally located damping layer, is positioned between the outer layers 410 and 420.

As with the fairing 100, the fairing 400 of FIG. 4 may be constructed by cutting a sheet material into a rectangular strip. The rectangular strip is folded over at the midpoint to create two legs of equal length. The two legs are the layers 410 and 420. The faring may be woven around armor strands of the cable 145.

Figure 5:
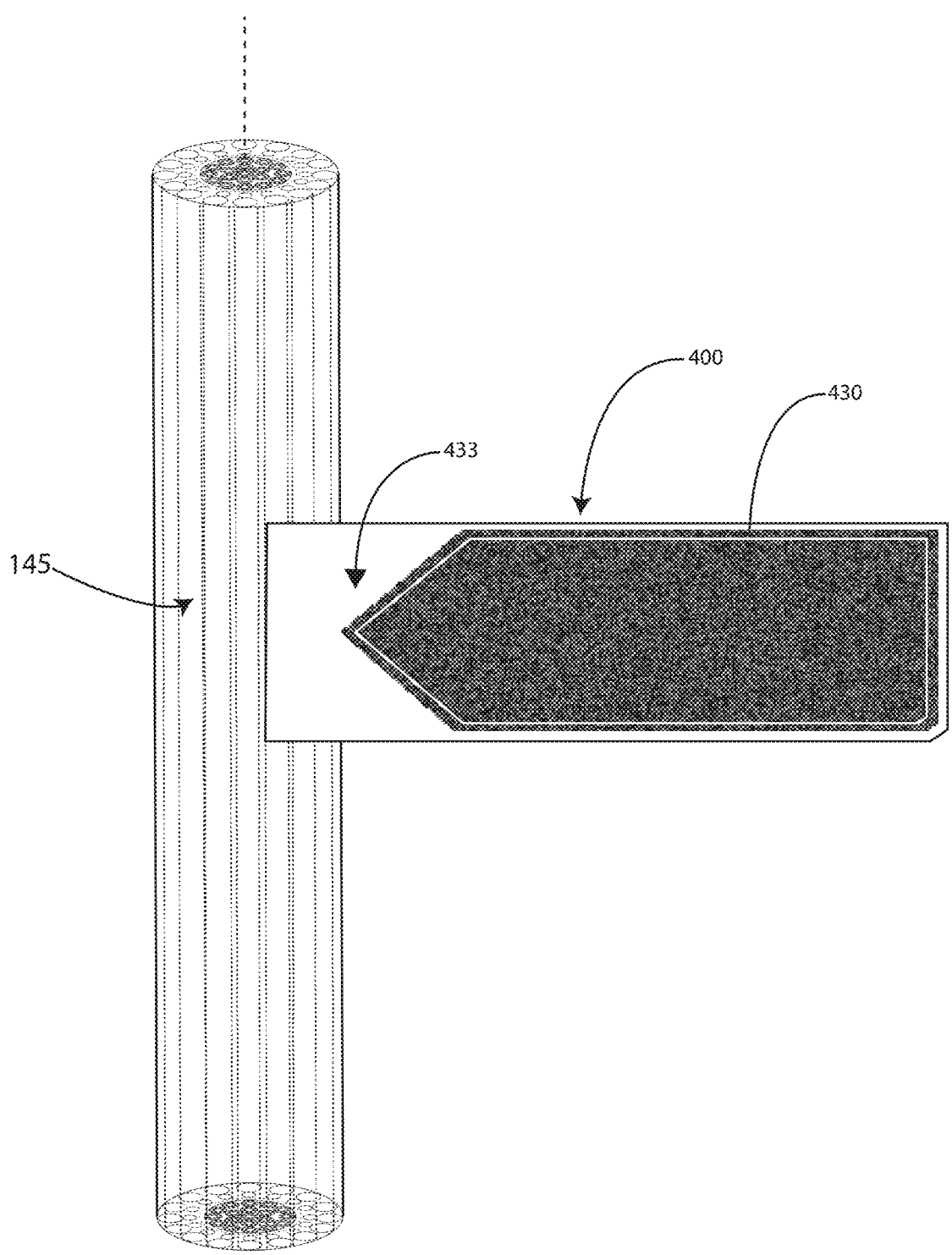
FIG. 5 is an exemplary top perspective illustration of the three-layer mono-ribbon sandwich cable fairing, according to an embodiment of the invention.

FIG. 5 is an exemplary top perspective illustration of the mono-ribbon sandwich cable fairing 400, according to an embodiment of the invention. The mono-ribbon sandwich cable fairing 400, which is woven into the armor of the cable 145, is shown from above. FIG. 5 shows the middle damping layer 430, which is at the center of the multi-layered arrangement. As shown, the middle damping layer 430 in the shape of a five-sided polygon. As shown, the fore end of the damping layer 430 has an equilateral triangle having a vertex 433. The vertex 433 of the polygon points toward the cable 145. As outlined below, the structure of the damping layer 430, particularly the pointed "V" shape, allows for a gradual increase in stiffness along the length of the sandwich cable fairing 400.

As stated above and as shown in FIG. 5, the vertex 433 of the polygon damping layer 430, points to the cable. This orientation of the polygon damping layer 430 allows for a higher composition of the elastic material of the first 410 and second 420 outer layers, as compared to the damping material of layer 430, in that region that is close to the cable, which increases the fairing's flexibility. The "V" shaped vertex of the polygon damping layer 430 causes a gradual increase in stiffness in the fairing 400, the stiffness increasing from the fore end of the fairing towards the aft end of the fairing 400. The angle of the vertex 433 of the polygon may be changed to adjust the fairing's flexibility and damping effect.

Figure 6A:
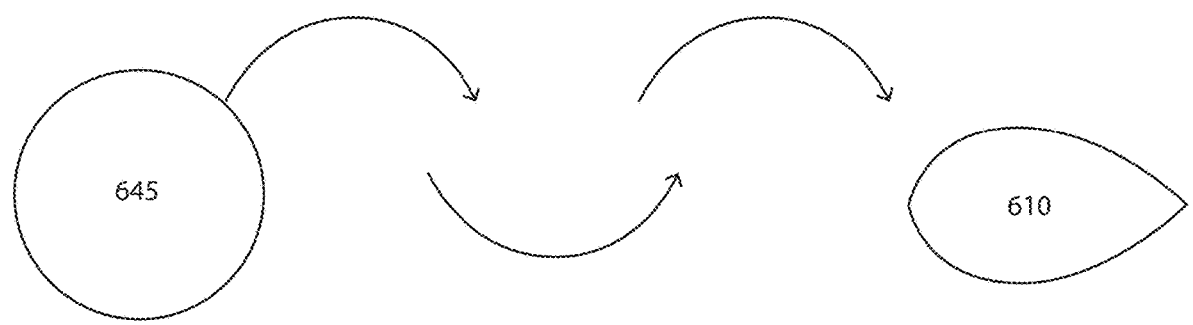
FIG. 6A is an exemplary explanatory illustration of a towing system having a cylindrical cable and an object downstream of the cable, according to an embodiment of the invention.

As stated above, cable fairings attached to cables typically towed by marine vessels. It should be understood that occasionally in towed system design, a strut or other object is placed directly downstream of a cylindrical cable. FIG. 6A is an explanatory illustration of a towing system having a cylindrical cable 645 and an object 610 downstream of the cable 645. FIG. 6A also shows vortices 615 shed by the cable 645. In these scenarios, the vortices 615 shed by the cable can cause severe vibration as they impinge on the downstream object 610.

Figure 6B:
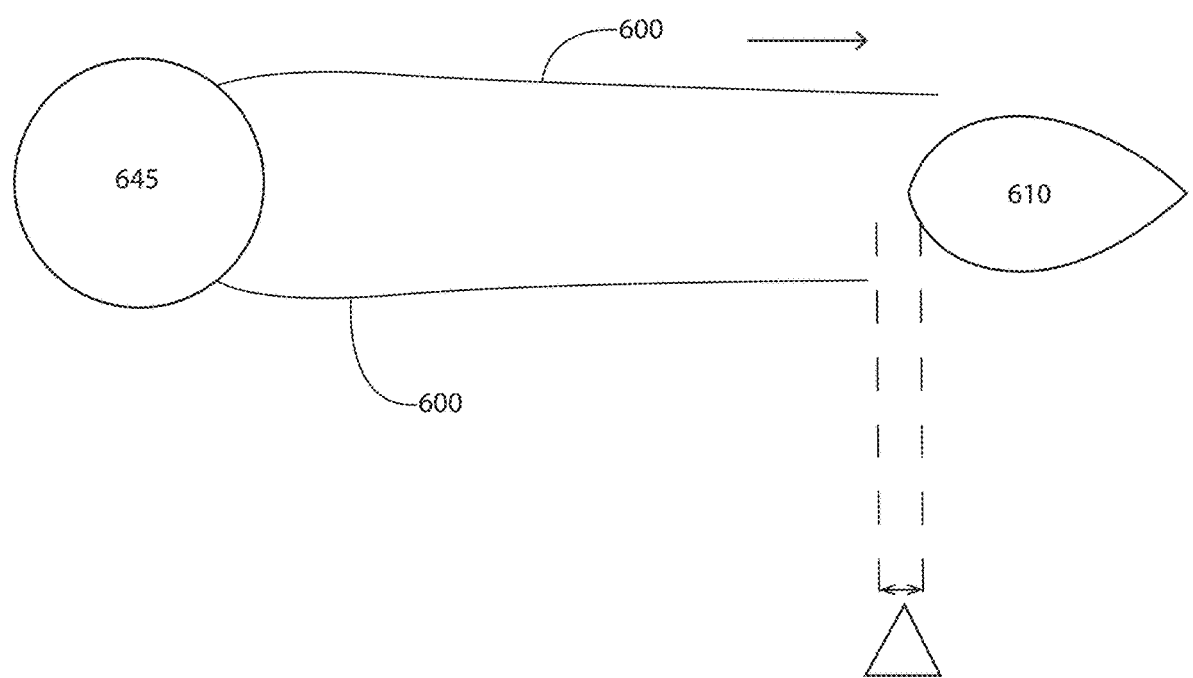
FIG. 6B is an exemplary explanatory illustration of a towing system having a cylindrical cable and an object downstream of the cable, with sandwich ribbon fairings attached to the cylindrical cable, according to embodiments of the invention.

FIG. 6B is an explanatory illustration of a towing system having a cylindrical cable 645 and an object 610 downstream of the cable 645. To reduce or eliminate the vibration on both the upstream cylindrical cable 645 and the downstream object 610, sandwich fairings 600 are placed on either side of the upstream cylindrical cable, and extend toward the object, so that in the downstream direction Y, there is a gap A, between the object 610 and the end of the aft end of the fairing 600. The sandwich fairings 600 as positioned in FIG. 6B introduce porous walls in the gap between the cylindrical cable 645 and the o object 610. The sandwich fairings also prevent the formation of vortices (shown in FIG. 6A).

It should be understood that the sandwich fairing 600 illustrated in FIG. 6B may be any of the sandwich fairings 100 or 400 as outlined above, as the sandwich fairings 600 include the structural benefits as outlined above in the description of the sandwich fairing embodiments 100 and 400. Regarding the system of FIG. 6B, the fairings do not flap, which allows them to endure the high operational speeds without damaging vibrations, and allows for the beneficial effects of low flow velocities.

What has been described and illustrated herein are preferred embodiments of the invention along with some variations. The terms, descriptions and figures used herein are set forth by way of illustration only and are not meant as limitations. Those skilled in the art will recognize that many variations are possible within the spirit and scope of the invention, which is intended to be defined by the following claims and their equivalents, in which all terms are meant in their broadest reasonable sense unless otherwise indicated.

What is claimed:

1. A sandwich fairing for an armored cable comprising:
   a rectangular strip of multilayered adhesive material with a midpoint, wherein the rectangular strip is woven around armor strands of the cable up to the rectangular strip's midpoint creating two equal length ends, and wherein the rectangular strip is folded, at its midpoint, around the armor strands and the equal length ends are adhered together to effectively create a five layered mono-ribbon sandwich fairing extending from the cable, wherein the five layers comprises:
a first layer of elastic material;
a second layer of elastic material;
a third layer of adhesive material between the first layer of elastic material and the second layer of elastic material;
a fourth layer of adhesive material between the third layer of adhesive material and the second layer of elastic material; and
a fifth layer of damping material, behind the cable, between the third layer of adhesive material and the fourth layer of adhesive material.

2. The sandwich cable fairing of claim 1, wherein the cable has a given diameter D and the rectangular strip of has a length L, extending from the cable, wherein the length L is 3-10 times the diameter D of the cable.

3. The sandwich cable fairing of claim 1, wherein the cable has a given diameter D and the rectangular strip of has a width W, wherein the width W is 0.2-1.5 times the diameter D of the cable.

4. The sandwich cable fairing of claim 2, wherein the fifth layer of damping material has a length $L_M$ that is 0.85 L.

5. The sandwich cable fairing of claim 1, wherein the elastic material is vinyl tape.

6. The sandwich cable fairing of claim 1, wherein the fifth layer of damping material is a viscoelastic urethane polymer.

7. The sandwich cable fairing of claim 6, wherein the viscoelastic urethane polymer has a thickness t that is 0.003 inches to 0.03 inches.

8. A sandwich cable fairing comprising:
a rectangular strip of multilayered adhesive material with a midpoint,
wherein
the rectangular strip is woven around armor strands of the cable up to the midpoint of the rectangular strip, creating two equal length ends, and wherein
the rectangular strip of is folded at its midpoint around the armor strands and the ends adhered together to create a three layered mono ribbon fairing extending from the cable, and wherein
the three layered mono-ribbon fairing comprises:
a first layer of elastic material;
a second layer of elastic material; and
a third layer of damping material attached to and between the first and second layer of elastic material behind the cable, wherein
the third layer of damping material is a five-sided polygon with an equilateral triangle having a vertex toward an end of the third layer next to the cable.

9. The sandwich cable fairing of claim 8, wherein the elastic material is vinyl tape.

10. The sandwich cable fairing of claim 9, wherein the third layer of damping material is a viscoelastic material.

11. The sandwich fairing of claim 8, wherein the vertex points towards the cable providing a gradual increase in stiffness in the sandwich fairing, increasing from a fore end of the sandwich fairing towards an aft end of the sandwich fairing.

12. A method for minimizing fairing flapping behind an armored cable comprising:
weaving a rectangular strip of multilayered, adhesive material with a midpoint around armor strands of the cable up to the midpoint of the rectangular strip creating two equal length ends;
folding the rectangular strip of adhesive material, around the armor strands of the cable, at its midpoint; and
adhering the ends of the rectangular strip together to create a five layered
mono-ribbon fairing extending from the cable, wherein the five layered mono-ribbon fairing comprises:
a first layer of elastic material;
a second layer of elastic material;
a third layer of adhesive material between the first layer of elastic material and the second layer of elastic material;
a fourth layer of adhesive material between the third layer of adhesive material and the second layer of elastic material; and
a fifth layer of damping material between the third layer of adhesive material and the fourth layer of adhesive material behind the cable.

13. The method of claim 12, wherein the cable is provided with a diameter D and the rectangular strip is provided with a length L, extending from the cable, wherein the length L is approximately 3-10 times the diameter D of the cable, wherein the cable the rectangular strip is provided with a width W, wherein the width W is approximately 0.2-1.5 times the diameter D of the cable, and wherein the fifth layer of damping material has a length $L_M$ that is approximately 85% of the length L of the rectangular strip.

14. A method for minimizing fairing flapping behind a cable comprising:
weaving a rectangular strip of multilayered, adhesive material with a midpoint around armor strands of the cable up to the rectangular strip's midpoint creating two equal length ends;
folding the rectangular strip of adhesive material at its midpoint around the armor strands and the cable; and
adhering the ends of the rectangular strip of adhesive material together to create a three layered mono-ribbon fairing extending from the cable, wherein the three layered mono-ribbon fairing comprises:
a first layer of elastic material;
a second layer of elastic material; and
a third layer of damping material attached to and between the first and second layer of elastic material behind the cable, wherein the third layer of damping material is a five-sided polygon with an equilateral triangle with its vertex toward an end of the third layer next to the cable.

* * * * *